No. 881,082. PATENTED MAR. 3, 1908.
A. E. KRAUSE.
APPARATUS FOR PURIFYING WATER AND STEAM AND FOR EXTRACTING
OIL AND GREASE.
APPLICATION FILED NOV. 23, 1905.

No. 881,082. PATENTED MAR. 3, 1908.
A. E. KRAUSE.
APPARATUS FOR PURIFYING WATER AND STEAM AND FOR EXTRACTING OIL AND GREASE.
APPLICATION FILED NOV. 23, 1905.

WITNESSES:

INVENTOR
Arthur E. Krause
BY
H. M. Marble
ATTORNEY

UNITED STATES PATENT OFFICE.

ARTHUR E. KRAUSE, OF JERSEY CITY, NEW JERSEY.

APPARATUS FOR PURIFYING WATER AND STEAM AND FOR EXTRACTING OIL AND GREASE.

No. 881,082.   Specification of Letters Patent.   Patented March 3, 1908.

Application filed November 23, 1905. Serial No. 288,722.

*To all whom it may concern:*

Be it known that I, ARTHUR E. KRAUSE, a citizen of the United States, residing in Jersey City, in the county of Hudson and State of New Jersey, have invented certain new and useful Improvements in Apparatus for Purifying Water and Steam and for Extracting Oil and Grease, of which the following is a specification.

My invention relates generally to apparatus for purifying water and steam, and particularly to apparatus for removing grease and the like from water and steam, as for example removing lubricating oil from steam or water of condensation of steam power plants.

My improved apparatus for purifying water and steam and extracting oil therefrom is particularly intended for carrying out the process of my Patent No. 705,253, dated July 22, 1902, involving the mixing with the steam or water to be purified of a material, such as serpentine sand, which has the power of attracting and collecting the minute globules of oil and grease in water or steam, thereby facilitating the separation of the oil and grease from the water or steam and making possible the substantially complete elimination of the emulsified or finely divided oil which ordinary mechanical oil separators are incapable of removing.

My improved steam and water purifying and oil-extracting apparatus comprises means for agitating and abrading a mass of fibrous, pulverulent or granular material such as may be used in accordance with my said process, in the presence of water or other fluid to be purified, elutriating the abraded particles by and mixing the same with the water or other fluid. In the case of water purification, such fluid may be the water to be purified; in the case of steam purification, such fluid may be water or other suitable liquid through which the steam is passed.

The objects of my invention are to improve and simplify steam and water purifying and oil-extracting apparatus, to make the same simple, compact, automatic, and economical; and to remove substantially all traces of oil and the like from water and steam.

I will now proceed to describe my invention with reference to the accompanying drawings, illustrating certain embodiments thereof, and will then point out the novel features in claims.

In said drawings, Figures 1-7 inclusive illustrate water purifying apparatus, and Fig. 8 a steam purifying apparatus. Figs. 2-5 inclusive illustrate another form of water purifying apparatus comprising in a single structure a skimming tank, a grinding and mixing chamber, an agitator, and a filtering chamber and filter; Figs. 6 and 7 show another form of self-contained water purifying apparatus.

Figure 1:
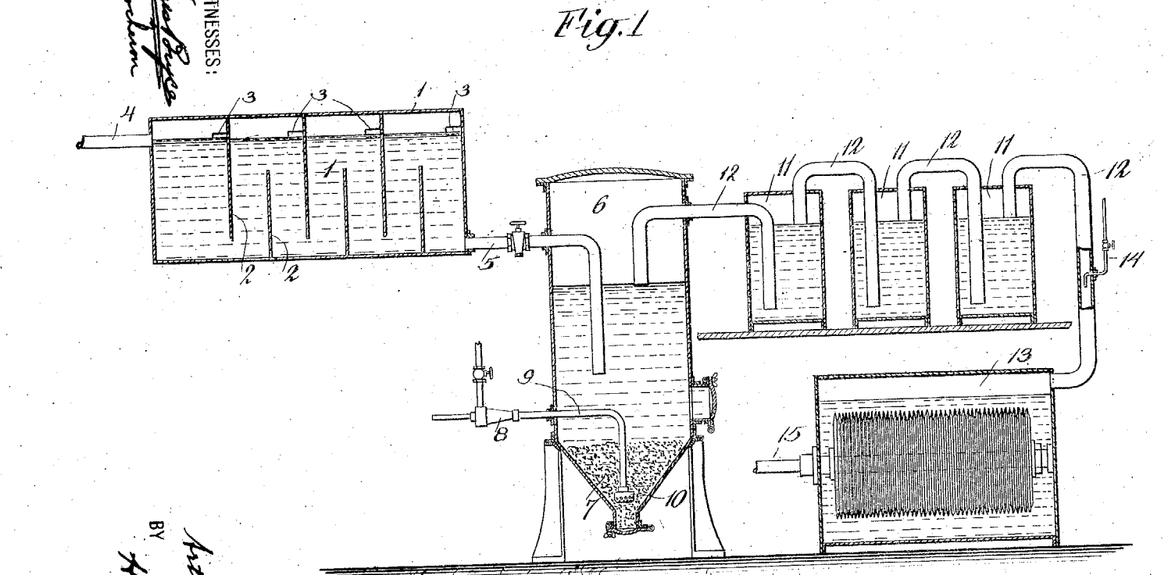
Fig. 1 shows diagrammatically in section an elementary form of water purifying apparatus.
Figure 2:
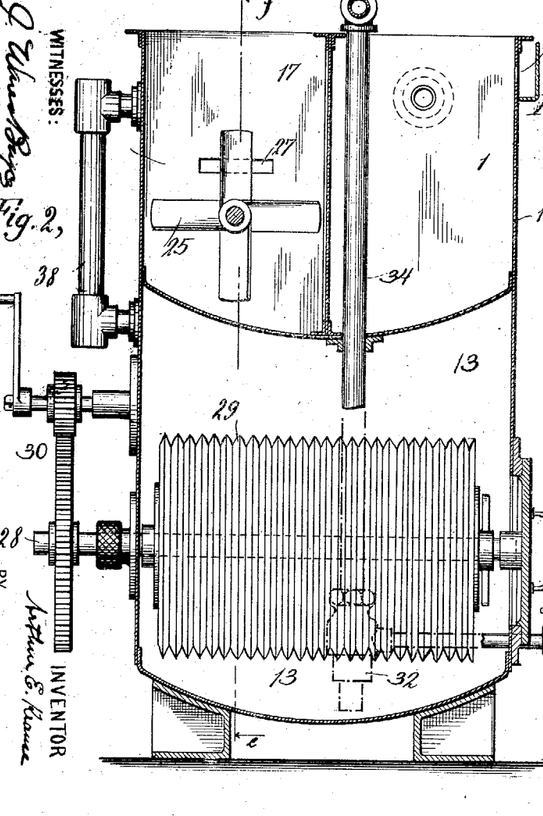
Fig. 2 showing a vertical section on line $a$—$b$ of Figs. 4 and 5, Fig. 3 showing a vertical transverse section through the grinding and mixing compartment on line $c$—$d$ of Figs. 4 and 5, Fig. 4 showing a top view of the apparatus, and Fig. 5 showing a longitudinal vertical section on the line $e$—$f$ of Figs. 2 and 4, a portion of the casing which covers and guards the grinding and mixing device being broken away.
Figure 3:
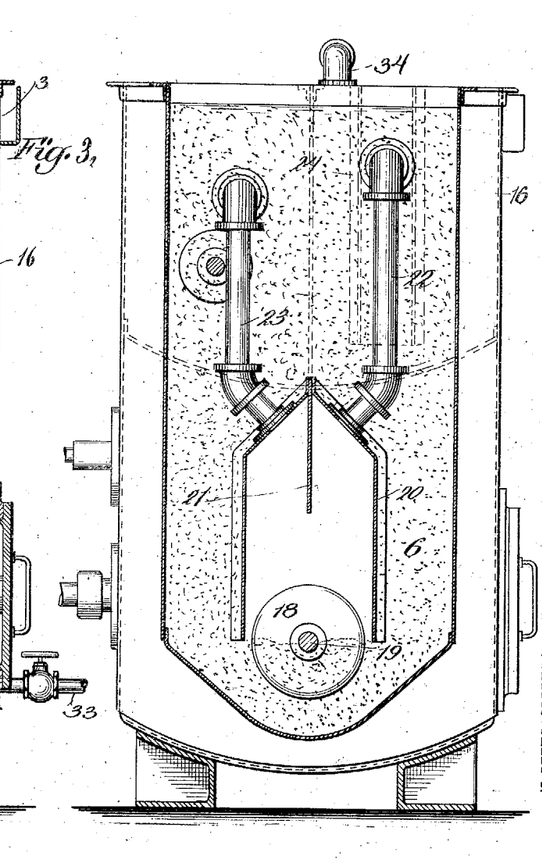
Figure 4:
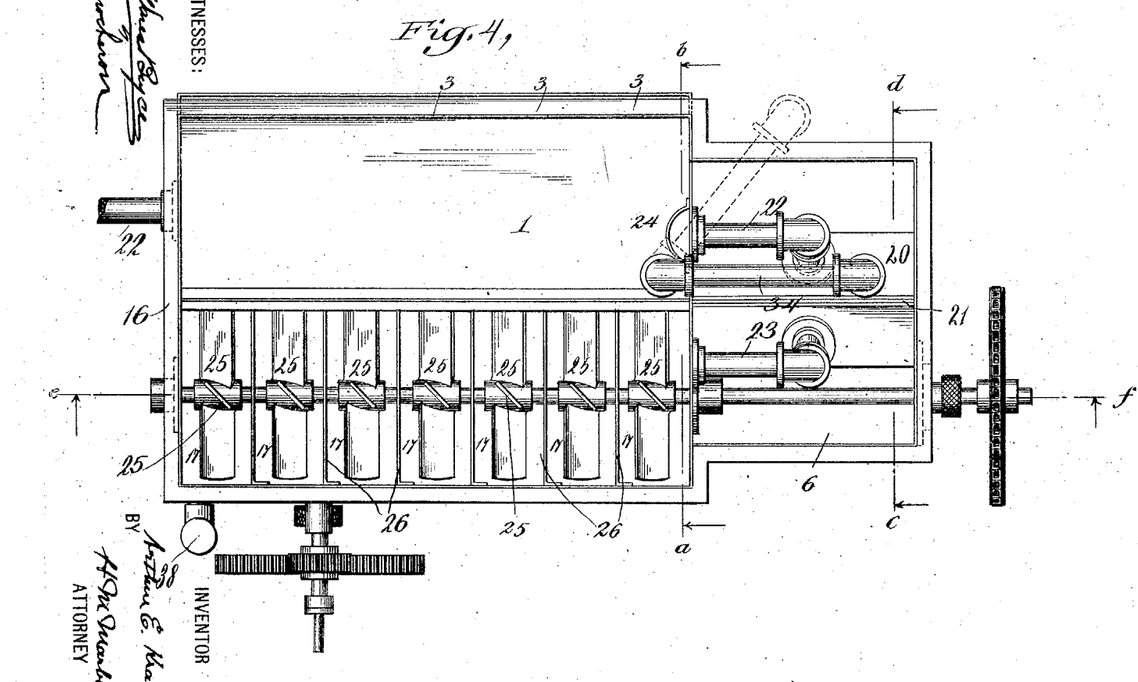
Figure 5:
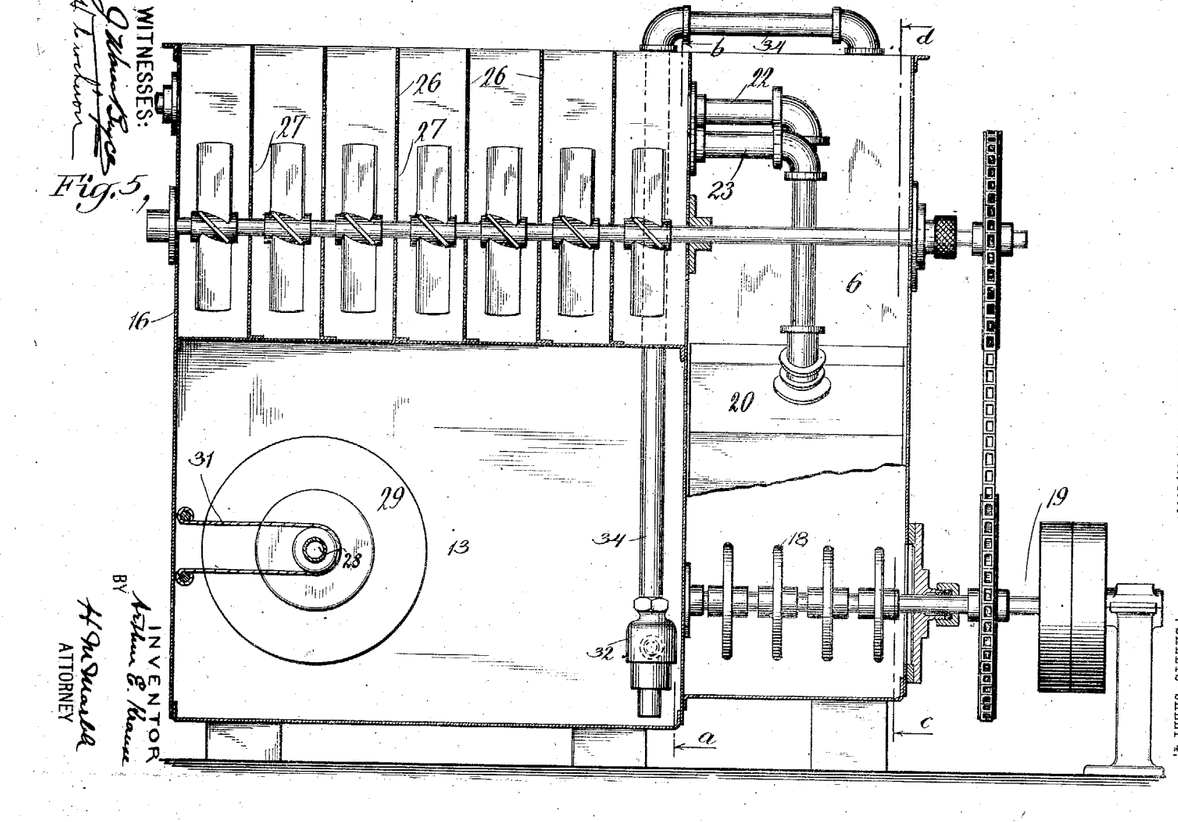

Referring first to Fig. 1, showing the water purifying apparatus in elementary form, numeral 1 designates a skimming tank through which the water to be purified first passes in order that it may be freed from the coarser particles of oil that rise readily to the surface of the water, said tank being divided into chambers by vertical baffles 2, each chamber being provided with a suitable skimming orifice 3 at the normal surface level, such orifices serving to permit the flowing off of the oil on the surface of the water. Water enters through pipe 4, and passes out through pipe 5 into the mixing chamber 6. Said mixing chamber is preferably closed, and is provided at its bottom with a layer 7 of the purifying material employed, which material, according to the process which said apparatus is particularly designed to carry out, may be serpentine sand, fibrous serpentine, etc., as specified in my said patent. Means for abrading or grinding up this material 7, to reduce it to a fine powder, and for mixing said powder with the water, is provided, such means consisting of the injector 8, arranged to force air, or mixed steam and air, through a pipe 9 and rose 10 into the material 7 and thereby to stir and agitate violently this material, the resulting attrition grinding the material to a fine powder. The agitation causes the material 7 to mix with and be elutriated by the water, which then passes from chamber 6 into the first of a series of what may be termed "segregating" chambers 11, i. e., chambers in which the segregating action on the oil mainly takes place, time being afforded therein for the completion of the operation, and to secure intimate contact between the minute oily globules and the fine elutriated particles resulting from the abrasion of the magnesian mineral, out of the influence of currents such as exist in chamber 6 which might sweep relatively untreated water to the outlet. The agitation in each of the chambers insures that any relatively coarse particles which may have been carried forward shall be tumbled and disintegrated, while by drawing off the effluent water at the top the passage forward of elutriates only is much facilitated. For picking up minute oil globules it is very desirable that the mineral be in very fine fibers or particles. The water is drawn from chamber 6 into the first of chambers 11, by the first of a series of siphon pipes 12, and thence is drawn from chamber to chamber by other similar siphon pipes, the final pipe delivering into filtering chamber 13. Tank 1 may be at any suitable or convenient height with respect to chambers 6 and 11, and is usually at a higher elevation, as shown, to avoid pumping. Tank 6 being closed and under pressure, sufficient air will pass over through pipes 12 into chambers 11 to agitate the water in those chambers and keep the purifying material in suspension, and likewise to bring all particles of oil in the water in such chambers into contact with the purifying material. The level of the water in each chamber 11 can never fall below the mouth of the outlet siphon of that chamber. I may provide a relief outlet 14, at a suitable point in the system, to relieve the pressure to such extent as may be desired, before the water enters chamber 13.

The filter within chamber 13 may be of any suitable type. I have indicated a bag filter, such as that covered by my Patent No. 630,363, dated Aug. 8, 1899. By this filter, the purifying material 7 carried by the water, and the oil particles formerly in the water and which have collected upon the particles of the material 7, are held back, the water thus purified passing out through pipe 15.

The apparatus thus described is simple, compact, and entirely practical both in large and small sizes, and is particularly suitable where waste steam under slight pressure is available to operate the injector 8, as for example on shipboard. All of its parts may be completely closed so that no water is lost by slopping over and the like. Also, because the several parts are relatively small, they may be disposed readily in the contracted spaces usually available on shipboard.

The forms of apparatus shown in the remaining figures are self-contained, and moreover are provided with mechanically-operated grinding and mixing devices. Referring first to the form shown in Figs. 2–5 inclusive, 1 indicates as before a skimming tank, 6 a mixing chamber adapted to form a reservoir to contain a considerable quantity of the purifying material and provided with means for grinding up this material and mixing it with the water, and 13 indicates a filtering chamber, and 17 a segregating chamber all comprised within the main casing 16. The skimming and segregating chambers, are placed side by side, with the filtering chamber beneath and the mixing chamber and reservoir, 6, at the end. The segregating chamber is provided with means for stirring and agitating the water to insure uniform action of the purifying material and to keep such material in suspension. The device for grinding up the purifying material and mixing it with the water, with which chamber 6 is provided as aforesaid, consists of a plurality of grinding disks 18 mounted on a shaft 19 in the lower part of chamber 6. These disks are shielded, so as not to be covered by the purifying material to such extent as to interfere with their grinding and mixing action, by a casing 20 forming an interior chamber and provided with a dividing partition 21.

Water is delivered from tank 1 to the space on one side of this partition by a pipe 22, and thence passes beneath said partition to the opposite side thereof and thence up to the segregating chamber 17 through a pipe 23. Such water, in passing beneath the partition, becomes thoroughly mixed with the purifying material. The water is drawn by pipe 22 from near the bottom of tank 1, the entrance to said pipe being guarded by a partition 24 extending nearly to the bottom of tank 1 and forming substantially a continuation of pipe 22.

The agitator 25 within chamber 17 is of substantially ordinary type, comprising a plurality of stirring blades mounted on a revolving shaft and located between transverse partitions 26 in which are openings 27 through which the water flows. By means of this agitator the purifying material is kept in suspension in the water and is brought into contact with all portions of the water, being thereby given ample opportunity to collect all particles of oil in the water. The water passes from chamber 17 to filter chamber 13 through pipe 38.

Chamber 6 holds sufficient purifying material to last a considerable time without renewal. It may be filled to the top. The bell-chamber 20 and partition 21 prevent the purifying material from covering the grinding disks 18 to such extent as to prevent the mixing and grinding action of said disks. Either serpentine sand or the waste of (serpentine) asbestos working may be used in the apparatus. The action of the disks on the latter substance reduces it to a fine fluffy powder which is excellently adapted for the purifying action.

The hollow shaft 28 of the bag filter 29 within chamber 13 is shown as revolubly mounted, gearing 30 being provided for rotating it. Such rotation is for the purpose of cleaning the filter, and is required only at intervals. Suitable means may be provided for scraping from the filtering surfaces, as they revolve, the deposit of purifying material thereon, as for example flexible cords or wires 31 between the filter bags. I further provide means for elevating from filtering chamber 13 the deposit of purifying material and oil which will collect on the bottom of said chamber, such means in the instance shown, comprising an ejector 32 arranged to be operated by steam, air or water under pressure supplied through pipe 33. The discharge pipe 34 for this ejector may be arranged to swing so that the material elevated from chamber 13 may be returned into chamber 6, or may be discharged outside the apparatus, as desired.

Figure 6:
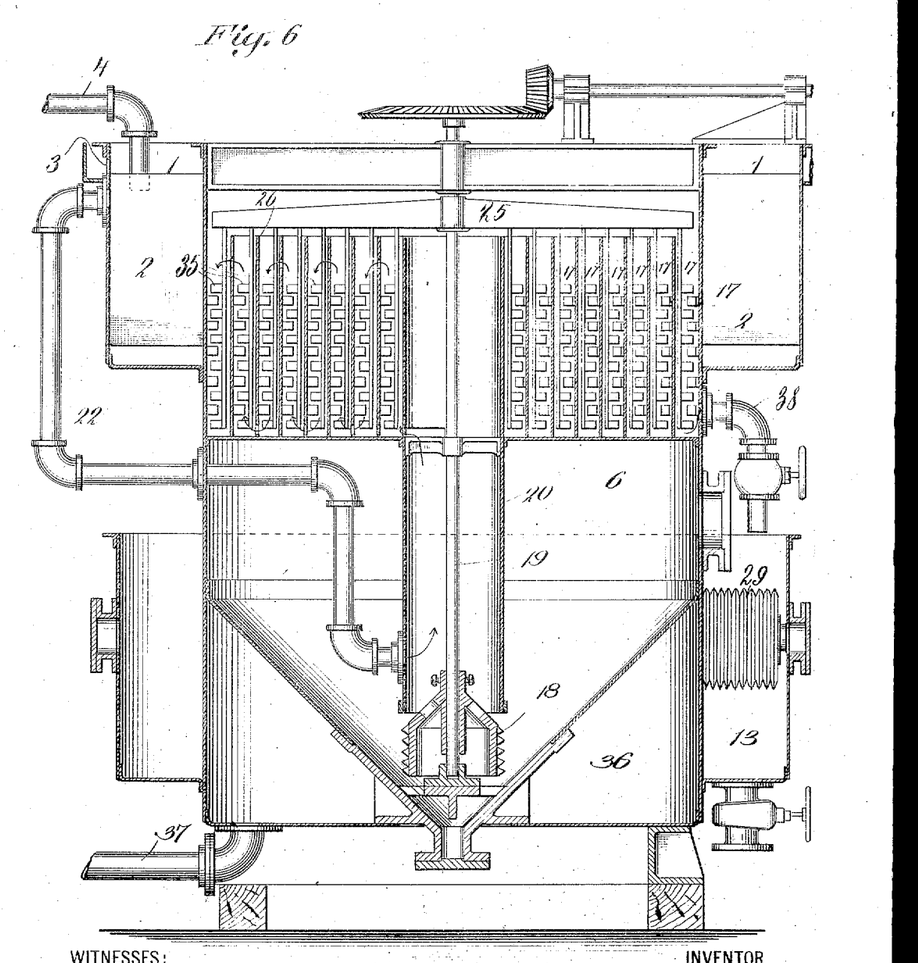
Fig. 6 showing a central vertical section thereof and Fig. 7 a top view.
Figure 7:
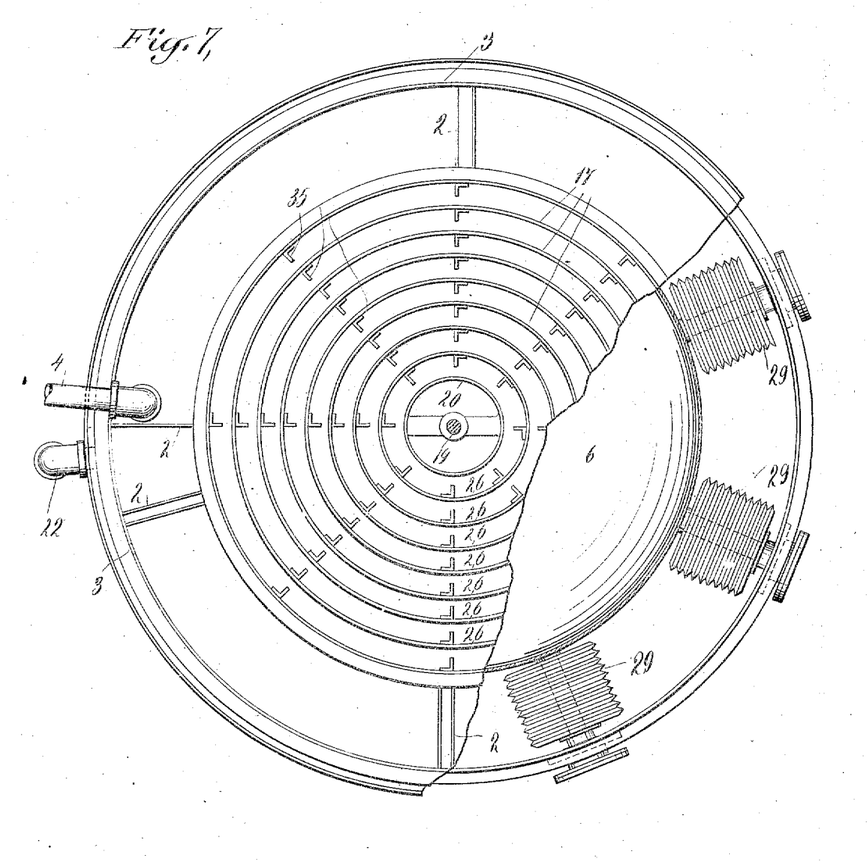

Referring now to Figs. 6 and 7, illustrating a third form of the apparatus, 1 as before designates a skimming tank, 6 the chamber or reservoir for the purifying material, 17 the segregating chamber, 20 the casing covering and guarding the grinding device, and 13 the filtering chamber. In the arrangement shown, the skimming tank is a trough surrounding the segregating chamber 17, and provided with a number of partitions 2 extending nearly to the bottom of trough 1, whereby the trough is divided into a plurality of chambers each provided with its individual oil overflow opening 3. From the last compartment of the trough 1 the water passes through pipe 22 into the casing 20, which casing is, in this form of apparatus, a vertical tube at the center of the segregating chamber 17 and reservoir 6. The grinding and mixing device 18 is mounted on a vertical shaft 19 within this casing 20. The same shaft carries the agitator 25, comprising stirring blades working within the annular chambers formed by concentric partitions 26. Said partitions carry stationary blades 35 interposed between the rotary blades of the agitator. From the outer compartment of segregating chamber 17 the water, carrying with it the purifying material in suspension, passes into the filtering chamber 13, the filters of which discharge into a chamber 36, from which the filtered water flows into pipe 37. The operation of this apparatus is the same as that of that illustrated in Figs. 2-5, and will be obvious from the foregoing description.

Figure 8:
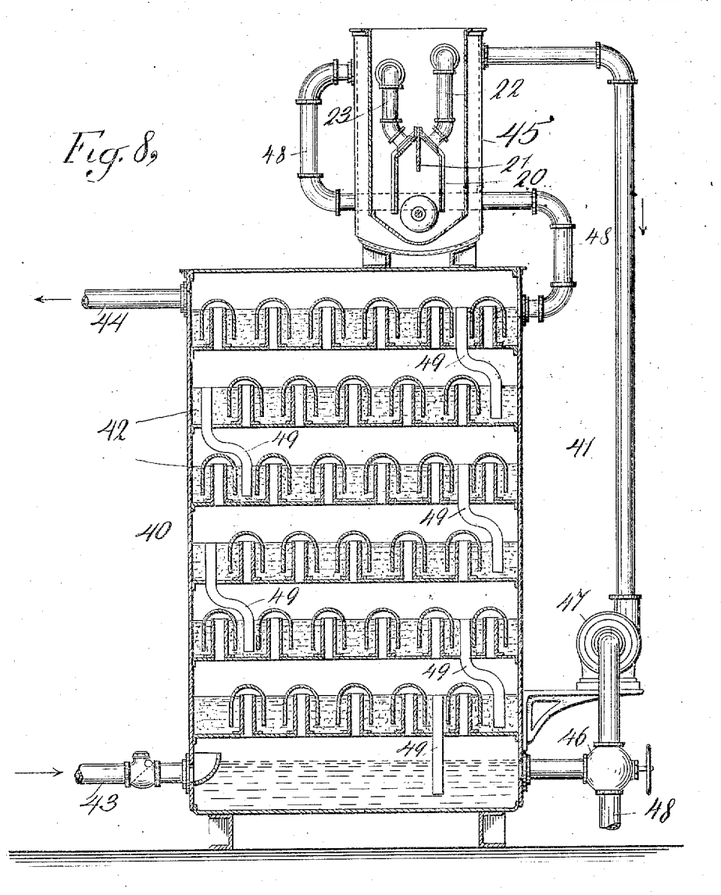
Fig. 8 shows diagrammatically in central vertical section a steam purifying apparatus embodying my invention.

Instead of purifying water of condensation, the steam may be relieved of its oil before condensation. This has the important advantage of preventing contact of the acids of the lubricating oil with the tubes and other surfaces of the condenser, and also tends to prevent fouling of the condenser, and has other advantages as well. Fig. 8 illustrates diagrammatically an apparatus which may be employed for the purpose, comprising a washer, 40, somewhat resembling washers such as are used in the making of gas, and consisting of a series of chambers arranged one above the other, and provided with overflow pipes 41, which maintain a normal water level in each chamber, and with trapped steam outlets, 42, the mouths of which are below the level of the water in the several chambers. Steam entering pipe 43 will bubble up through water in the several compartments of the washer, finally escaping through pipe 44. The water in said washer is of course kept at substantially the boiling point by the heat of the steam, and hence there is little or no condensation of steam in the washer.

The water within the washer is charged with purifying material in suspension, supplied by any suitable device, that indicated, and designated by numeral 45, being similar to the device for impregnating the water with purifying material employed in the apparatus of Figs. 2-5, already described. This device 45 therefore requires no further description. Water is drawn from the bottom compartment of the washer by a pipe 46, and is forced upward by a pump 47 into the device 45, wherein the water becomes charged with purifying material which remains in suspension in the water, said water then flowing through pipe 48 into the top chamber of the washer and thence downward as before.

The oil carried by the steam passing through the washer is brought into intimate contact with the purifying material carried by the water, such oil particles being in fact, at the time, as much in the water as in the case of the water of condensation treated in the forms of apparatus illustrated in Figs. 1-7 inclusive. Such oil is collected by the purifying material, therefore, and passes off with it through pipe 46.

A draw-off connection 48 is provided, whereby when the purifying material has become so charged with oil that it is no longer efficient it may be drawn off; and obviously the water passing out through pipe 46 might be passed through a filter or settling tank, to avoid the return of oil-charged material to reservoir 45.

It will be understood that settling tanks are obvious equivalents for the filters illustrated in the drawings of the various forms of apparatus above described, and may be substituted for such filters without departing from the spirit and scope of my invention.

What I claim is:—

1. In water purifying apparatus, the combination of a chamber provided with means for abrading and disintegrating an insoluble mineral purifier, in the presence of water, and means for elutriating the disintegrates with said water, a second chamber adapted to receive and thoroughly admix the elutriates and water and to perfect elutriation and a filter receiving and filtering the elutriates from said second chamber.

2. In water purifying apparatus, the combination of a chamber containing an insoluble mineral purifier, means in said chamber for abrading and elutriating said purifier in the presence of water, a second chamber adapted to receive the elutriates and water and thoroughly admix the same and to perfect elutriation and a filter receiving and filtering the elutriates from the second chamber.

3. In water purifying apparatus, the combination of a chamber containing an insoluble mineral purifier, means in said chamber for grinding said purifier in the presence of the water to be purified, means for transporting water and elutriates into a second chamber, thoroughly admixing the same therein and perfecting elutriation and a filter receiving and filtering the elutriates from the second chamber.

4. In water purifying apparatus, the combination in a single structure of a chamber adapted to receive and contain a body of an insoluble mineral purifier, means therein for abrading and elutriating portions of the same in the presence of water and a chamber adapted to receive and filter the elutriates.

5. In water purifying apparatus, the combination in a single structure of a chamber adapted to receive and contain body of insoluble mineral purifier, means for grinding the same in the presence of water, means for admixing and elutriating the disintegrates and water, and a chamber receiving the mixture and provided with filtering means.

6. Water purifying apparatus comprising, in a single structure, a mixing chamber adapted to contain a solid oil-segregating material and provided with means for mixing the same with the water, an oil segregating chamber arranged to receive the water from said mixing chamber, and a filtering chamber provided with filtering means and arranged to receive the water from said segregating chamber.

7. Water purifying apparatus comprising, in a single structure, a mixing chamber adapted to contain a solid oil-segregating material and provided with means for mixing the same with the water, an oil segregating chamber arranged to receive the water from said mixing chamber, and provided with an agitator, and a filtering chamber provided with filtering means and arranged to receive the water from said segregating chamber.

8. In water purifying apparatus, the combination with a reservoir for a solid purifying material provided with a grinding and mixing device and with a casing above and guarding said latter device, of means for introducing water into said casing, a filtering chamber, and means for conveying the water from such casing to said chamber.

9. In water purifying apparatus, the combination with a reservoir for a solid purifying material provided with a grinding and mixing device and with a casing above and guarding said latter device, of means for introducing water into said casing, an oil segregating chamber connected to said casing to receive water therefrom, and a filter.

10. In water purifying apparatus, the combination in a single structure of the skimming chamber, the reservoir for solid purifying material arranged to receive water therefrom and provided with mixing means, the oil segregating chamber, and the filter.

11. In water purifying apparatus, the combination in a single structure of the skimming chamber, the reservoir for solid purifying material provided with grinding and mixing means and a casing covering the same and connected to the skimming chamber to receive water therefrom, the oil segregating chamber and the filter.

12. In water purifying apparatus, the combination in a single structure of the skimming chamber, the reservoir for solid purifying material provided with grinding and mixing means and a casing covering the same and connected to the skimming chamber to receive water therefrom, the oil segregating chamber, and the filtering chamber beneath the segregating and skimming chambers.

13. In apparatus such as described, the mixing chamber and reservoir for solid purifying material provided with grinding and mixing means and a casing covering the same and having a central partition and admission and discharge openings on opposite sides thereof.

14. In oil extracting apparatus such as described, the combination of mechanical grinding means for grinding purifying material and mixing the same with a fluid, and means for bringing such purifying material in suspension in the liquid into intimate contact with the oil particles.

15. In oil extracting apparatus such as described, the combination with a reservoir for purifying material, of mechanical grinding means for reducing the said material therein to a state of fine subdivision and for mixing such finely divided product with liquid containing oil.

16. In oil extracting apparatus such as described, the combination with a reservoir for purifying material, of mechanical grinding means and means for bringing the ground product into intimate contact with the oil particles.

In testimony whereof I hereunto affix my signature, in the presence of two witnesses.

ARTHUR E. KRAUSE.

Witnesses:
HARRY M. MARBLE,
ROGER H. LYON.